(12) United States Patent
De Beenhouwer et al.

(10) Patent No.: US 12,471,862 B2
(45) Date of Patent: Nov. 18, 2025

(54) PHASE-CONTRAST X-RAY IMAGING SYSTEM FOR OBTAINING A DARK-FIELD IMAGE AND A METHOD THEREFOR

(71) Applicants: IMEC VZW, Leuven (BE); UNIVERSITEIT ANTWERPEN, Antwerp (BE)

(72) Inventors: Jan De Beenhouwer, Geraardsbergen (BE); Jan Sijbers, Duffel (BE)

(73) Assignees: IMEC VZW, Leuven (BE); UNIVERSITEIT ANTWERPEN, Antwerp (BE)

( * ) Notice: Subject to any disclaimer, the term of this patent is extended or adjusted under 35 U.S.C. 154(b) by 178 days.

(21) Appl. No.: 18/567,282

(22) PCT Filed: May 31, 2022

(86) PCT No.: PCT/EP2022/064694
§ 371 (c)(1),
(2) Date: Dec. 5, 2023

(87) PCT Pub. No.: WO2022/258429
PCT Pub. Date: Dec. 15, 2022

(65) Prior Publication Data
US 2024/0260915 A1    Aug. 8, 2024

(30) Foreign Application Priority Data

Jun. 8, 2021 (EP) .................................. 21178284

(51) Int. Cl.
*A61B 6/00*    (2024.01)
*A61B 6/40*    (2024.01)

(52) U.S. Cl.
CPC ............ *A61B 6/482* (2013.01); *A61B 6/4035* (2013.01); *A61B 6/484* (2013.01); *A61B 6/5205* (2013.01)

(58) Field of Classification Search
CPC ....... A61B 6/482; A61B 6/4035; A61B 6/484; A61B 6/5205; G06T 2211/461
See application file for complete search history.

(56) References Cited

U.S. PATENT DOCUMENTS

| | | | |
|---|---|---|---|
| 2017/0213365 A1* | 7/2017 | Koehler | ............... G01N 23/041 |
| 2018/0140269 A1 | 5/2018 | Roessl et al. | |
| 2018/0228455 A1* | 8/2018 | Koehler | ................. A61B 6/482 |

OTHER PUBLICATIONS

Extended European Search Report from corresponding EP Application No. 21178284.2, Dec. 20, 2021.

(Continued)

*Primary Examiner* — Courtney D Thomas
(74) *Attorney, Agent, or Firm* — Workman Nydegger

(57) ABSTRACT

A computer-implemented method for obtaining dark-field X-ray projection data of an object includes: obtaining a first set of X-ray projection data of the object at a first energy spectrum; the first set of X-ray projection data having a first attenuation component, a first phase component, and a first dark-field component; obtaining a second set of X-ray projection data of the object acquired at a second energy spectrum having a higher effective energy than the first energy spectrum; and extracting the dark-field projection data from the first set of X-ray projection data by the second set of X-ray projection data having a lower dark-field component contribution than the first set of X-ray projection data.

15 Claims, 6 Drawing Sheets

(56) References Cited

OTHER PUBLICATIONS

International Search Report from corresponding PCT Application No. PCT/EP2022/064694, Aug. 11, 2022.
Y. Rakvongthai et al., "Spectral CT Using Multiple Balanced K-Edge Filters," IEEE Transactions on Medical Imaging vol. 34, No. 3, Sep. 19, 2014, pp. 740-747.
P.C. Diemoz et al., "Angular sensitivity and spatial resolution in edge illumination X-ray phase-contrast imaging", Nuclear Instruments and Methods in Physics Research A, vol. 784, pp. 538-541, Dec. 17, 2014.
Zamir, A., et al., "Robust phase retrieval for high resolution edge illumination x-ray phase-contrast computed tomography in non-ideal environments," Scientific Reports, vol. 6:31197, Aug. 9, 2016., 10 pages.
Fabio A. Vittoria et al., "Beam tracking approach for single-shot retrieval of absorption, refraction, and dark-field signals with laboratory x-ray sources," Applied Physics Letters, vol. 106, Issue 22, Jun. 2, 2015, pp. 224102-1-224102-5.

\* cited by examiner

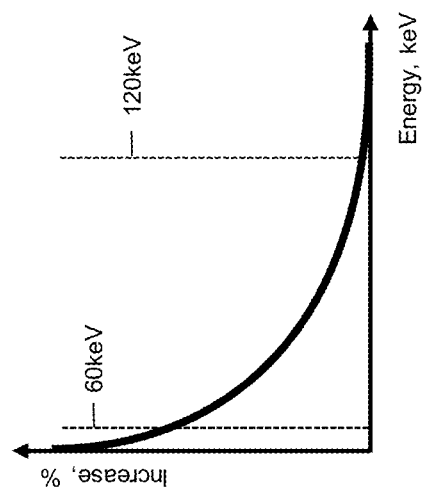
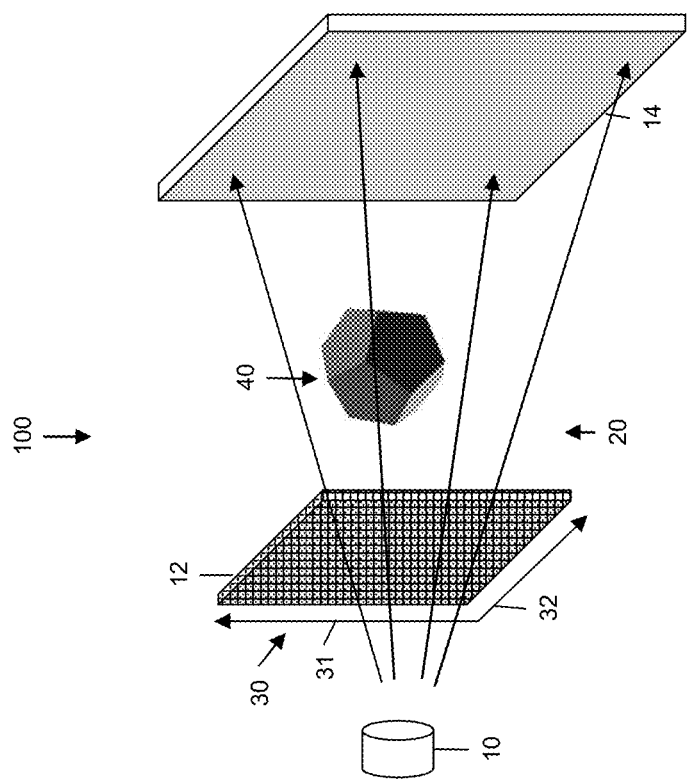
FIG.1A

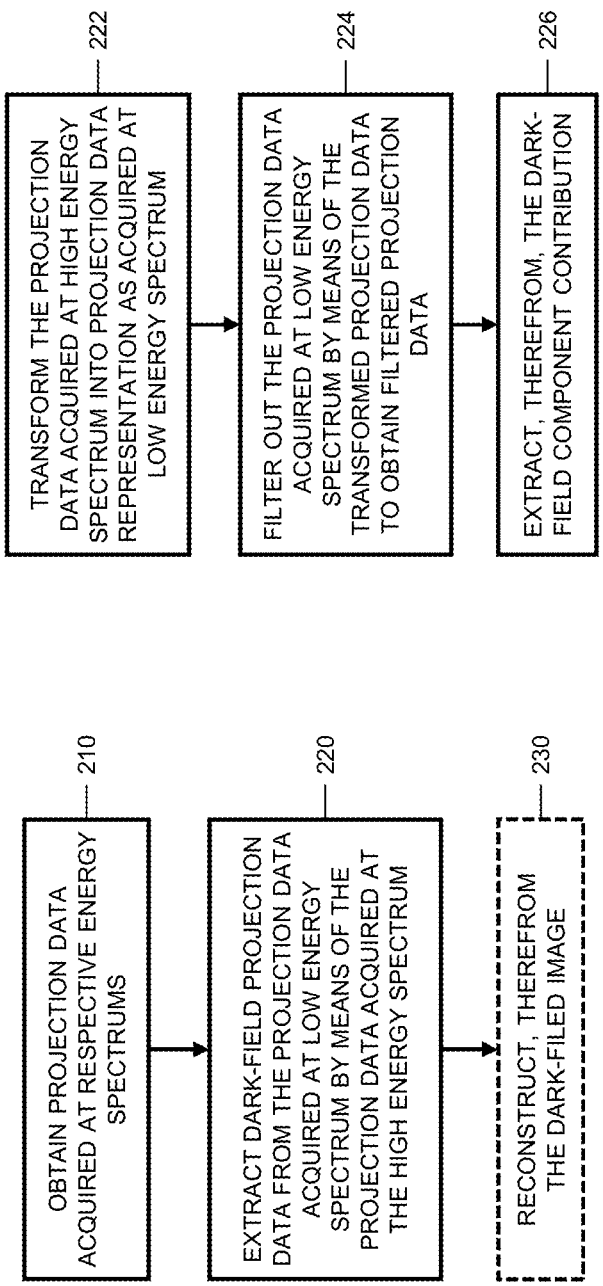

PHASE-CONTRAST X-RAY IMAGING SYSTEM FOR OBTAINING A DARK-FIELD IMAGE AND A METHOD THEREFOR

TECHNICAL FIELD

The present disclosure relates to a phase-contrast X-ray imaging system and a method for obtaining a dark-field image and more specifically for obtaining dark-field projection data.

BACKGROUND

Phase-contrast imaging provides in addition to the conventional X-ray attenuation image two further images, namely a phase contrast image and a dark-field image. The contrast in the phase contrast image is produced by the refraction of the X-rays within the imaged object, while the contrast in the dark-field image is formed through the mechanism of small-angle scattering of the X-rays.

Because of how the contrast in the dark-field image is formed, the dark-field image provides complementary and otherwise inaccessible structural information about the imaged object at a scale that is below the highest spatial resolution of the X-ray imaging system. However, it has been observed that when imaging objects such as lungs or some porous materials, the contrast in the dark-field image is weak making it hard and sometimes impossible to derive this additional structural information about the imaged object. To solve this problem, solutions have been proposed that rely on extending the acquisition time to one or more hours. However, in some use cases and, especially, in medical applications, extending the acquisition time is not only more expensive but also often practically infeasible. Other solutions propose using an imaging system employing expensive grating plates thus limiting their use in practise.

SUMMARY

It is an object of embodiments of the present disclosure to provide a dark-field imaging system and a method capable of obtaining dark-field projection data and, therefrom, a dark-field image overcoming the disadvantages of the conventional solutions.

The scope of protection sought for various embodiments of the invention is set out by the independent claims. The embodiments and features described in this specification that do not fall within the scope of the independent claims, if any, are to be interpreted as examples useful for understanding various embodiments of the invention.

This object is achieved, according to a first example aspect of the present disclosure, by a computer-implemented method for obtaining dark-field X-ray projection data of an object. In particular, the method comprises obtaining a first set of X-ray projection data and a second set of X-ray projection data of the object acquired at different energy spectrums. More specifically, the first X-ray projection data set is acquired at a first energy spectrum, while the second X-ray projection data set is acquired at a second energy spectrum having a higher effective energy than the first energy spectrum. Furthermore, the first set of X-ray projection data is acquired by means of a phase-contrast X-ray imaging system which is configured to capture not only the attenuation component which is produced by the absorption of X-rays in the object but also the phase component which is produced by the refraction of X-rays in the object and the dark-field component which is produced by the scattering of X-rays in the object. The first set of X-ray projection data will thus comprise a first attenuation component, a first phase component, and a first dark-field component. The second set of X-ray projection data is also acquired by the same X-ray imaging system. However, as the second set of X-ray projection data is acquired at the second energy spectrum, the second set of X-ray projection data will comprise different components' contribution than the first set of X-ray projection data. More particularly, the second set of X-ray projection data will have a much lower dark-field component contribution than the first set of X-ray projection data and an attenuation component contribution which is somewhat comparable to that in the first set of X-ray projection data. The method thus further comprises extracting the dark-field projection data from the first set of X-ray projection data by exploiting this observation. In other words, extracting the dark-field projection data from the first set of X-ray projection data in this manner allows obtaining X-ray projection data characterized with a dark-field component that is much less contaminated by the strong attenuation component.

Effective energy is a commonly used term in X-ray imaging to indicate the energy of a quantum of a beam of monochromatic radiation that is absorbed or scattered by a given medium to the same extent as a given beam of polychromatic radiation.

According to an embodiment, the second set of X-ray projection data comprises a second attenuation component and a second dark field component. This can be achieved, by imaging the object using one setup configuration of the imaging system instead of multiple. As detailed above, the second set of X-ray projection data will contain a lower dark-field component contribution than the first set of X-ray projection data and an attenuation component contribution which is comparable to that in the first set of X-ray projection data set. This observation allows to estimate the contribution of the first attenuation component from the second set of X-ray projection data. Further, as the contribution of the second attenuation component is not affected by a strong dark-field component, estimating the first attenuation component based on the second set of projection data will provide a more accurate estimate of the first attenuation component contribution than if the latter is directly determined from the first set of projection data set. This estimated contribution of the first attenuation component can then be taken into account to determine the first dark-field component contribution and therefore, to extract the dark-field component contribution from the first projection data set such that the extracted dark-field component contribution is much less contaminated by the strong first attenuation component.

According to an embodiment, the estimation of the first attenuation component contribution can be performed by first transforming the second set of X-ray projection data into projection data representation as acquired at the first energy spectrum to obtain a transformed set of X-ray projection data and then deriving the attenuation component contribution from the transformed set of projection data. The transformation can be performed by applying signal processing techniques that generate out of the second set of X-ray projection data, an approximated version with preserved ratios among the various contributions, i.e., the lower contribution of the dark-field component with respect to the remaining components in the projection data observed in the second set of X-ray projection data is preserved in the generated approximated version. As the ratio between the components' contribution is preserved in the transformed set of X-ray projection data, i.e., the dark-field component contribution in the transformed projection data set remains much lower than the dark-field component contribution in the first projection data set while the attenuation component contribution is substantially the same as the contribution of the first attenuation component, the derived attenuation component represents an estimate of the first attenuation component which is more accurate than if the attenuation component is directly determined from the first set of projection data set. This is because the derived attenuation component contribution is much less contaminated by the dark-field component. The deriving can, for example, be performed by any suitable for the purpose signal processing techniques such as techniques that exploits the statistical distribution of a data set. Examples of such techniques are mean squared error estimation, maximum a posteriori probability estimation and so on, where a parametric function, e.g., a Gaussian function, is fitted to the data set. In the present case, a Gaussian function can be fitted to the projection data corresponding to a respective detector pixel, i.e., to the intensity distribution of a respective detector pixel. Once the Gaussian functions are fitted to the intensity distributions of the respective detector pixels, the area under the Gaussian function is calculated to determine the contribution of the attenuation component. This contribution is calculated on pixel-bases. Alternatively, the estimation of the first attenuation component contribution can be done by performing the steps of transforming and deriving in a reverse order. In other words, the attenuation component from the second projection data set is derived and then transformed into an attenuation component contribution as acquired at the first energy spectrum. The derivation and the transformation can be performed in the same way as described above.

According to an embodiment, the second set of X-ray projection data is acquired in the same manner as the first X-ray projection data set. As a result, the second set of X-ray projection data of the object will comprise a second attenuation component, a second phase component, and a second dark field component. Similar to the preceding embodiments, as the second set of X-ray projection data is acquired at an energy spectrum with a higher effective energy than the first energy spectrum, the second set of X-ray projection data will contain a lower dark-field component contribution than the first set of X-ray projection data, while the contributions of the attenuation and phase components in the second set of X-ray projection data will be substantially the same to those in the first set of X-ray projection data set after transformation to the first energy spectrum. This allows to estimate the contribution of the first attenuation component based on the second set of X-ray projection data in the same way as described above. The contribution of the phase component can be estimated in the same way as the attenuation component with the addition that once a parameterized curve is fitted, the phase shift between the fitted parameterized curve and a baseline curve fitted to a baseline set of X-ray projection data acquired without imaging an object is calculated to derive the contribution of the phase component. The baseline projection data set is typically stored in the imaging system and can be acquired at calibration of the imaging system. The estimated contributions of the first attenuation and the first phase components are then taken into account to determine the first dark-field component contribution from the first set of the X-ray projection data. Similar to above, the derived attenuation component and the phase component contributions represents estimates of the first attenuation component and the first phase component contributions which are more accurate than if the latter are determined directly from the first set of projection data set. This is because the derived attenuation and phase component contributions are much less contaminated by the dark-field component.

According to an embodiment, the determining comprises modelling the first set of X-ray projection data by means of a parameterized curve fitting to derive the dark-field component contribution from the first set of projection data. The modelling can be performed by any suitable for the purpose signal processing techniques such as techniques that exploit the statistical distribution of a data set. Examples of such techniques are mean squared error estimation, maximum a posteriori probability estimation and so on, where a parametric function, e.g., a Gaussian function, is fitted to the data set. Herein, a parameterized function can be fitted to the intensity distribution of a respective detector pixel. During the fitting of the parameterized curve, the estimated contribution of the attenuation component and, if available, the contribution of the phase component, are used as constraints during the fitting of the parameterized curve. Doing so, allows to exploit a priori knowledge of the statistical distribution of the first projection data set, i.e., the area under the parameterized curve and the phase shift of the parameterized curve with respect to the baseline parameterized curve. Otherwise said, the fitting exploits the information about the phase shift and the area of the intensity distribution to model the intensity distribution in a more precise way which in turn allows for a more precise discrimination between the different components and, therefore, extraction of the dark-field component contribution. As a result, the extracted dark-field component contribution in the filtered set of X-ray projection data will be much less contaminated by the strong first attenuation component. Once the Gaussian functions are fitted to the intensity distribution of the pixels, the dark-field component contribution is determined by calculating the difference in spread of the fitted parameterized curve with respect to the baseline parameterized curve fitted to the baseline projection data.

According to alternative embodiments, the extraction of the dark-field projection data can be performed by filtering out the first attenuation component from the first set of X-ray projection data by exploiting the same observation, i.e., by means of the second set of X-ray projection data. More in particular, the extraction comprises transforming the second set of X-ray projection data into projection data representation as acquired at the first energy spectrum to obtain a transformed set of X-ray projection data. The transformation can be performed by applying, signal processing techniques that generate out of the second set of X-ray projection data, an approximated version with preserved ratios among the various contributions, i.e., the lower contribution of the dark-field component with respect to the remaining components in the projection data observed in the second set of X-ray projection data is preserved in the generated approximated version. This transformed set of projection data is then used as a reference projection data set to filter out the first attenuation component from the first set of X-ray projection data. The filtering can be performed by, for example, subtracting the transformed set of projection data from the first set of projection data, or other suitable for the purpose filtering techniques. As a result, a filtered set of X-ray projection data is obtained characterized with a filtered out or suppressed attenuation component. In other words, the phase and dark-field components in the filtered set of X-ray projection data will not be contaminated by the strong attenuation component. Finally, the dark-field X-ray projection data is extracted from the filtered set of X-ray projection data. As a result, the extracted dark-field component in the filtered set of X-ray projection data will be much less contaminated by the attenuation component.

According to an embodiment, the second set of X-ray projection data is also acquired in the same manner as the first set of X-ray projection data. As a result, the second set of X-ray projection data of the object comprises a second attenuation component, a second phase component, and a second dark field component. Similar to the preceding embodiment, the second set of X-ray projection data will contain a lower dark-field component contribution than the first set of X-ray projection data, and attenuation and phase components' contribution comparable to those in the first set of X-ray projection data set after transformation to first energy spectrum. As a result, the first attenuation and first phase components in the first set of projection data will be filtered out or significantly suppressed in the extracted dark-field component. Thus, the resulting dark-field component which will be much less contaminated by the attenuation component.

According to an embodiment, the extracting of the dark-field projection data from the first set of X-ray projection data is performed by means of artificial intelligence. An example of an artificial intelligence is machine learning which employs a trained learning model. The training of the learning model is performed using a training data set which comprises sets of X-ray projection data of one or more ground truth objects acquired at the first and second energy spectrums. The various ground truth objects can, for example, comprise one material or a combination of materials. The materials can, for example, correspond to the various soft tissues and/or hard tissues found in the human body. The learning model can be trained to perform the extraction by means of a learning system implementing, for example, support vector machine, random forest, and neural networks such as a deep neural network, DNN, a recurrent neural network, RNN, a graph neural network, GNN, or a convolutional neural network, CNN. Once trained, the learning model can perform the extraction of the dark-field projection data from the first set of X-ray projection data.

According to an embodiment, the method further comprises selecting the first energy spectrum and the second energy spectrum for imaging a desired material of the object, wherein the selection is done based on a pre-determined relationship between the energy spectrum and the desired material. The pre-determined relationship between the energy spectrum and the desired material can be obtained upfront, i.e., before imaging the object. For example, this can be done during a calibration procedure where various materials are imaged at various energy spectrums with respective effective energy. As a result, plots characterizing the relationship between the energy spectrum and the various materials are obtained. The information from these plots can then be used to derive the first and second energy spectrums for imaging the desired material of the object with an optimal signal-to-noise ratio.

According to an embodiment, the X-ray projection data is acquired by any suitable for the purpose phase-contrast X-ray imaging system, i.e., by any X-ray imaging system employing phase-contrast imaging and capable of recording the attenuation, the phase, and the dark-field component. Examples of suitable phase-contrast X-ray imaging systems include phase-contrast X-ray imaging systems comprising one or more gratings, or a speckle-based filter.

According to an embodiment, the method further comprises reconstructing the extracted dark-field projection data into an X-ray image. The reconstruction of the projection data can be done by any conventional reconstruction technique. More specifically, the contribution of the dark-field component is calculated from the dark-field projection data on a pixel-bases. The dark-field X-ray image is then constructed from the calculated contributions which define the intensity value for the respective pixels in the image.

According to a second example aspect, an apparatus for obtaining dark-field X-ray projection data of an object is disclosed. In particular, the apparatus comprises at least one processor and at least one memory. The processor can be any suitable general-purpose processor. The memory may include volatile memory, non-volatile memory, or a combination thereof. The memory further stores a computer program code in the form of program instructions which together with the processor, causes the apparatus to perform the method according to the first aspect.

The various example embodiments of the first example aspect may be applied as example embodiments to the second example aspect.

According to a third example aspect, a phase-contrast X-ray imaging system is disclosed, the phase-contrast X-ray imaging being configured to acquire sets of X-ray projection data of an object at energy spectrums having respective effective energies and comprising the apparatus according to the second example aspect.

According to an embodiment, the imaging system further comprises an X-ray band-pass filter. The X-ray band-pass filter is placed in front of the X-ray source and is configured to allow the emission of X-rays with the respective energy spectrums for the imaging of the object. More specifically, the X-ray band-pass filter reduces the intensity of the wavelengths lying outside of the passband of the filter. As a result, it is guaranteed that the X-ray projection data sets of the object are acquired using X-rays with an energy spectrum having a desired effective energy.

According to an embodiment, the phase-contrast X-ray imaging system is a dual-energy imaging system. According to a preferred embodiment, the dual-energy imaging system comprises a dual-energy X-ray source such as a kV switching X-ray source and a dual-energy X-ray detector. Such a dual-energy imaging system allows capturing the X-ray projection data sets at the respective energy spectrums without the need of changing the X-ray source and/or detector to acquire the projection data sets at the different energy spectrums. Furthermore, such a dual-energy imaging system allows acquiring of the two projection data sets in a single X-ray acquisition.

According to an embodiment, the dual-energy X-ray source comprises two single-energy X-ray sources each of them configured to emit X-rays with a different energy spectrum. Furthermore, the dual-energy X-ray detector comprises two single-energy X-ray detectors. Using such a dual-energy imaging system allows the replacement of the defective source and/or detector, thus reducing the maintenance costs for the imaging system. Furthermore, such a dual-energy imaging system allows the replacement of one of the X-ray sources and one of the X-ray detectors to acquire X-ray projection data for a specific material of the object.

According to an embodiment, the X-ray detector can be a spectral energy detector. Such a spectral energy detector records the X-ray photons in different energy bins thus allowing the capturing of projection data sets at the different energies at the same time.

The other example embodiments of the first example aspect may further be applied as example embodiments to the third example aspect.

According to a fourth example aspect, a computer program product is disclosed comprising computer-executable instructions for causing an apparatus to perform the computer-implemented method according to the first example aspect when run on the apparatus.

According to a fifth example aspect, a computer readable storage medium is disclosed comprising computer-executable instructions for causing an apparatus to perform the computer-implemented method according to the first example aspect when run on the apparatus.

The various example embodiments of the first example aspect may be also applied as example embodiments to the fourth and fifth example aspects.

BRIEF DESCRIPTION OF THE DRAWINGS

Some example embodiments will now be described with reference to the accompanying drawings.

FIG. 1A shows a phase-contrast X-ray imaging system according to an example embodiment of the present disclosure.

FIG. 2A shows steps for obtaining dark-field X-ray image according to a first example embodiment of the present disclosure.

FIG. 2B shows steps for obtaining dark-field X-ray projection data according to the first example embodiment of the present disclosure.

DETAILED DESCRIPTION OF EMBODIMENT(S)

Figure 1B:
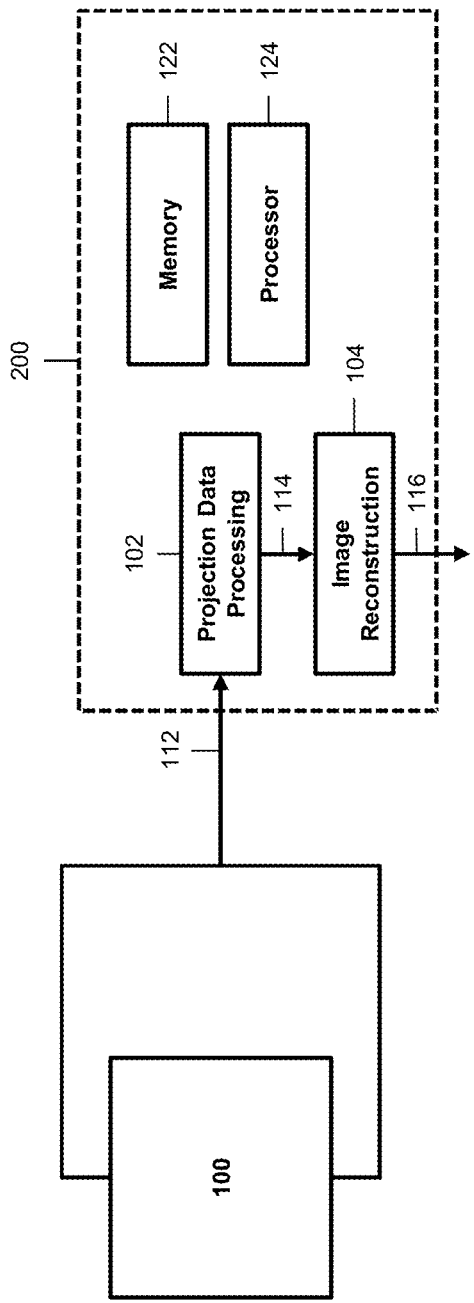
FIG. 1B shows an apparatus for obtaining dark-field X-ray projection data according to an example embodiment of the present disclosure.

FIG. 1A shows a simplified block scheme of phase-contrast X-ray imaging according to an example embodiment of the present disclosure. The imaging system 100 comprises a dual-energy X-ray source 10, a dual-energy X-ray detector 14, and a grating 12 placed between the X-ray source and the X-ray detector. The dual-energy X-ray source 10 can be a fast kV switching X-ray source or any other X-ray source capable of emitting two energy spectrums having different effective energy. For example, the kV switching source can emit a first X-ray beam with an effective energy of 60 keV and another X-ray beam with an effective energy of 120 keV. Optionally, the X-ray source 10 may be provided with an X-ray high-pass or band-pass filter (not shown in the figure). The X-ray filter is configured to allow the emission of X-rays with the respective energy spectrums for the imaging of the object, thus reducing the intensity of the wavelengths of the X-ray beam lying outside the desired energy spectrum. The X-ray filter could be any suitable for the purpose filter such as a Cu or Al high-pass filter, or a combination of such Cu or Al filters creating a band-pass filter. Such band-pass filters are commonly referred to as k-edge filters. An example of such a k-edge filter is described in Y. Rakvongthai et al, "*Spectral CT using multiple balanced k-edge filters*," IEEE transactions on medical imaging Vol. 34, pages 740-747, (2014). The dual-energy X-ray detector 14 can be any X-ray detector capable of recording or capturing X-rays emitted by the dual-energy X-ray source 10. The grating 12 is a plate comprising apertures or holes distributed over its surface in a regular fashion which are small enough to generate an X-radiation with an interference pattern from the emitted X-ray beam.

To examine an object 40, for example, a patient, the object is positioned between the X-ray source 10 and the grating 12 on the one side and the X-ray detector 14 on the other side and imaged at two different energies, i.e. 60 keV and 120 keV. The energies to image the object can be selected based on the material composition of the imaged object. As shown in the plot in FIG. 1A, 60 keV and 120 keV may be used for the imaging of the patient, for example. Placing the object in this way causes the X-radiation to undergo a phase shift which changes the beamlets generated by the grating 12, and therefore the intensity distribution of the x-radiation detected by the X-ray detector, in a measurable manner. This changed intensity distribution is detected or recorded by the X-ray detector 14. More in particular, each decoder pixel records or detects such an intensity distribution. Each of these intensity distributions comprises a mixture of an attenuation, a differential phase, and dark-field components. The components' contribution at each pixel corresponds respectively to the location-dependent attenuation, the location-dependent phase shift, and the location-dependent dark-field which can be inferred by back-calculation from a previously measured intensity distribution without an object—so-called baseline projection data. The attenuation component which is produced by absorption of X-rays in the object can then be obtained from the location-dependent attenuation while the differential phase component which is produced by the refraction of X-rays in the object can be obtained from the location-dependent phase shift and the dark-field component which is produced by the scattering of the X-rays in the object from the angular spread.

As the object is imaged using two different energy spectrums, the X-ray detector will record two sets of such intensity distributions per pixel; one at the first energy spectrum and another one at the second energy spectrum. As a result, two sets of X-ray projection data will be recorded with one set acquired at the first energy spectrum and another set acquired at the second energy spectrum with each set of X-ray projection data comprising intensity distributions for the respective detector pixels.

As the angular spread of the X-rays caused by the material composition of the object changes with the energy spectrum of the X-radiation much more than the absorption and the refraction of the X-rays, the obtained sets of X-ray projection data will comprise different components' contributions. More specifically, as the second set of projection data is acquired at an energy spectrum with a higher effective energy than the first set, the second set of projection data will comprise a much lower dark-field component contribution than the first set and somewhat comparable to the first set attenuation and differential phase components' contributions.

FIG. 1B shows further details of the imaging system 100 of FIG. 1A, wherein the parts of the imaging system 100 which are identical to the imaging system of FIG. 1A are denoted by identical reference signs. In this figure, the imaging system includes in addition to the imaging system of FIG. 1A, a projection data processing module 102, an image reconstruction module 104, a memory, and a processor.

Algorithms to operate the projection data processing module 102, and the image reconstruction module 104 are provided as software instructions stored in the memory. The memory may be volatile or non-volatile, or a combination thereof. The memory may store program instructions as well as projection data generated by the imaging system and any other data needed by the imaging system. The processor executes the instructions stored in the memory and controls the operation of the imaging system 100, i.e., the operation of the projection data processing module 102, and the image reconstruction module 104.

In some embodiments, the projection data processing module 102 may be provided internally or externally to the imaging system 100. Similarly, the projection data processing module 102 and the image reconstruction module 104 may be provided internally or externally to the imaging system 100. In these embodiments, when module 102 or modules 102 and 104 are provided externally to the imaging system, they may include separate memory and processor.

In the example shown in FIG. 1B, the projection data processing module 102 and the image reconstruction module 104 are provided externally to the imaging system to forming a processing apparatus 200 which is also provided with a separate memory 122 and a separate processor 124.

A first example of the method for obtaining an improved dark-field X-ray projection data, according to the present disclosure, will be now explained with reference to FIG. 2A.

In the first step, i.e. step 210, the two sets of X-ray projection data of the object at the respective energy spectrums acquired by the imaging system 100 in the same way as described above with reference to FIG. 1A are obtained by the projection data processing module 102. As described above, the first and second set of projection data comprise an intensity distribution for each detector pixel which comprises a mixture of an attenuation, a differential phase, and a dark-field component.

In the second step of the method, i.e., step 220, projection data processing module 102 extracts the dark-field projection data from the first set of projection data by means of the second set of projection data as further detailed in FIG. 2B. The extraction exploits the observation, as described above, that the contribution of the dark-field component in the first projection data set is higher than in the second projection data set, while the attenuation and the differential phase components contribution in the first projection data set are similar to those in the second projection data set.

Figure 1C:
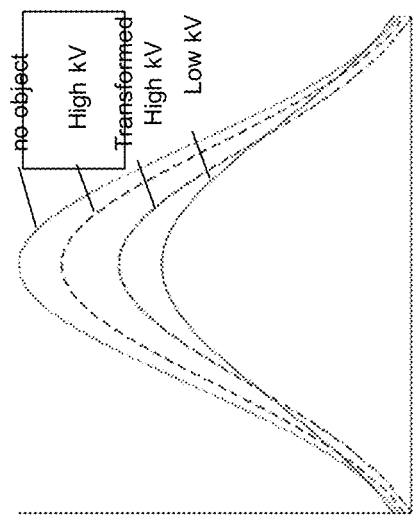
FIG. 1C shows an example of interference patterns obtained with the phase-contrast X-ray imaging system of FIG. 1A.

More specifically, to perform the extraction the projection data processing module 102 transforms 222 the second set of projection data into a projection data representation as acquired at the first energy spectrum to obtain a transformed set of X-ray projection data. Doing so causes the intensity distribution acquired at the second energy spectrum to be modified in such a way that its attenuation component contribution becomes substantially the same as the attenuation component contribution of the first set of projection data while the ratio between the respective components' contributions is preserved. This is illustrated conceptually in FIG. 1C which shows illumination curves derived from the intensity distributions recorded by a detector pixel at the different energies. These illumination curves can be obtained by, for example, fitting a parameterized curve such as a Gaussian curve, to a respective intensity distribution using, for example, mean squared error estimation. For the sake of clearly illustrating the effect of the attenuation and dark-field components on the distribution of the illumination curve, these effects have been exaggerated in this figure. The contribution of the phase component which results in a shift of the illumination curve has, however, not been illustrated for simplicity reasons. As it can be seen from the figure, the illumination curve recorded by the detector pixel at the low energy without an object being imaged, i.e. 'no object', which is referred to as the baseline illumination curve, has the highest magnitude, while the illumination curves recorded when imaging an object at the low energy, i.e. 'Low kV', and high energy, 'High kV', have a much lower magnitude which reflects the contribution of the attenuation component in the recorded projection data for that detector pixel. Similarly, the 'Low kV' and 'High kV' illumination curves have a broader spread than the 'no object' curve which reflects the contribution of the dark-field component in the 'Low kV' and 'High kV' illumination curves. Furthermore, it can be seen that the dark-field component contribution in the 'High kV' is higher that the dark-field component contribution in the 'Low kV' as the spread of the 'High kV' curve is bigger, while the contribution of the attenuation components in the 'Transformed High kV' and 'Low kV' are substantially the same, i.e., the area under the two curves is substantially the same.

Figure 4:
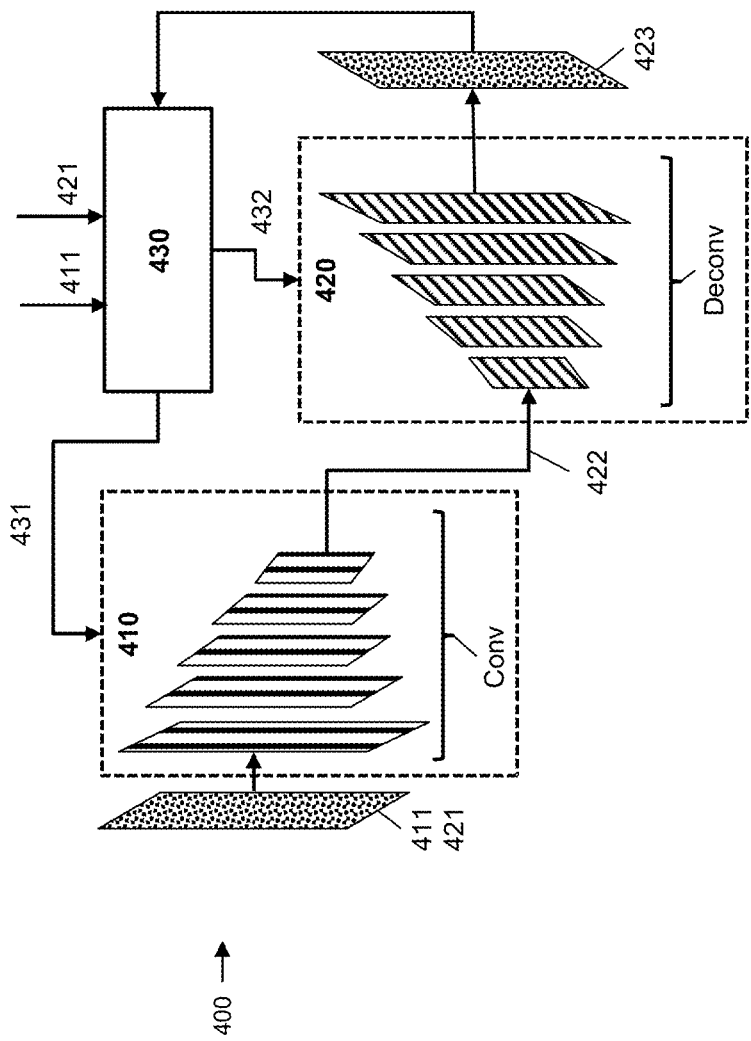
FIG. 4 shows an example architecture of an autoencoder for training a deep learning model according to the present disclosure.

The transformation could be done by employing signal processing algorithms as detailed below with reference to FIG. 4 and FIG. 5 which aim to preserve the proportion of the component's contribution as observed in the original projection data, i.e., the lower contribution of the dark-field component with respect to the remaining components in the projection data is preserved in the generated approximated version.

Next, the projection data processing module 102 uses the transformed X-ray projection data to extract the dark-field component from the first set of X-ray projection data. As the transformation of the second projection data set is done to preserve the proportion of the components' contribution in the transformed projection data set, the extraction can be performed filtering out 224 the first set of projection data by means of the transformed set of projection data. This could be done by simply subtracting the transformed projection data set from the first projection data set. The subtraction is performed on a pixel-per-pixel basis. As a result, filtered projection data set is obtained comprising information about the dark-field component and differential phase contributions. Finally, the projection data processing module 102 extracts 226 the contribution of the dark-field component by simply calculating the area under the filtered set of projection data. Thus, a dark-field component contribution is derived on a pixel-per-pixel basis. The differential phase component can also be extracted from the filtered set of projection data by calculating the phase shift between the baseline projection data and the filtered set of projection data is calculated.

Alternatively, the filtering out 224 can be performed as follows. Once, the transformed projection data set is obtained, the projection data processing module 102 calculates the magnitude of the intensity distribution for the respective detector pixel. Then, the projection data processing module 102 modifies the intensity distribution of the baseline projection data such that its magnitude corresponds to the magnitude of the transformed projection data set. This magnitude modification is done in such a way that the spread of the intensity distribution of the baseline projection data is preserved. As a result, a modified baseline projection data is obtained which purely reflects the attenuation component in the first projection data set. This modified baseline projection data set is then used to filter out the first projection data set. Similar to above, this can be done by simply subtracting the modified baseline projection data set from the first projection data set. Herein again, the subtraction is done on a pixel-per-pixel basis. As a result, a filtered projection data set is obtained comprising the dark-field component and the differential phase component. Finally, the contribution of the dark-field component is extracted 226 from the filtered set of projection data. To do so, the projection data processing module 102 calculates the area under the filtered set of projection data in the same way as described above. Thus, a dark-field component contribution is derived on a pixel-per-pixel basis. Herein again, the differential phase component can also be extracted from the filtered set of projection data by calculating the phase shift between the baseline projection data and the filtered set of projection data is calculated.

In the final step, i.e., step 230, the projection data processing module 102 feeds the extracted dark-field component contribution for the respective detector pixels to the image reconstruction module 104. The image reconstruction module then creates the dark-field image by simply ordering the extracted dark-field component contribution in the form of a two-dimensional array.

In some embodiments, the single grating 12 of the X-ray imaging system 100 can be substituted by two gratings, for example. In this case, to examine the object, the object is positioned between the X-ray source 10 and the first grating on the one side and the second grating and the X-ray detector 14 on the other side. The first and second gratings are commonly referred to as a sample grating and a detector grating or mask, respectively. The detector mask period is designed to follow the pixel spacing on the detector, while the sample mask follows a scaled down period depending on the geometric magnification to account for the beam divergence. When using two gratings, the projection data is acquired by misaligning the sample and the detector gratings by, for example, +50%. Doing so allows to disentangle or separate the attenuation component from the refraction component. An intensity distribution for a respective detector pixel is then derived from the shifted images, which represents the fraction of photons transmitted through the aperture of the detector as described by P. C. Diemoz et al. in, "*Angular sensitivity and spatial resolution in edge illumination X-ray phase-contrast imaging*", Nuclear Instruments and Methods in Physics Research Section A, 784, 538-541, 2015. It has been shown that the attenuation component reduces the beam intensity by a constant factor, while the refraction deviates the beam, and therefore shifts the intensity distribution. The small angle scatter on the other hand broadens the intensity distribution.

Differently from the imaging system described above with reference to FIG. 1A and FIG. 1B, when using the imaging system with two gratings, the first set of X-ray projection data can be acquired to comprise the three different components, i.e., the attenuation, differential phase, and dark-field components, while the second set of X-ray projection data can be acquired to comprise the above three components or only an attenuation component. To obtain a second set of X-ray projection data comprising only an attenuation component, a single acquisition of the object is taken. In such a scenario, the result of the filtering step 220 will be a filtered set of X-ray projection data with a significantly suppressed attenuation component and preserved differential phase and dark-field component. The dark-field component contribution and differential phase component contribution can be extracted in the same way as described above.

Optionally, the method may further comprise an additional filtering step, in which the filtered X-ray projection data is further processed to suppress the differential phase component. This could be done by means of conventional filtering techniques.

A second example of the method for obtaining the dark-field X-ray projection data, according to the present disclosure, will be now explained with reference to FIG. 3A.

In the first step, i.e., step 310, the two sets of X-ray projection data of the object at the respective energy spectrums acquired by the imaging system 100 in the same way as described above in the first example embodiment are obtained by the projection data processing module 102. Similar to the first example embodiment, the acquired sets of projection data comprise respective mixtures of an attenuation, differential phase, and dark-field components.

In the second step, i.e., step 320, the projection data processing module 102 extracts the dark-field projection data from the first set of projection data by means of the second projection data set as detailed further in FIG. 2B. Herein, the step of extraction exploits the same observation, however, the extraction is performed in a different matter. More specifically, the projection data processing module 102 first transforms 322 the second projection data set into a projection data representation as acquired at the first energy spectrum to obtain a transformed projection data set. The transformation step 322 is performed in the same way as the transformation step 222. As a result, the intensity distribution acquired at the second energy spectrum are modified in such a way that its attenuation component contribution becomes substantially the same as the attenuation component contribution of the first set of projection data while the ratio between the respective components' contributions is preserved.

Next, the projection data processing module 102 derives 324 the contribution of the attenuation and phase components from the transformed projection data set. The contribution of these components is derived on a pixel-per-pixel bases as follows. First, the transformed projection data, and, more specifically, the transformed intensity distribution, for the respective pixel, is modelled by a mean squared error estimation or by any other suitable for the purpose signal processing techniques that can fit a parameterized function, such as a Gaussian function, to the projection data. Examples of such techniques are described in Zamir, A., et al. in "*Robust phase retrieval for high resolution edge illumination x-ray phase-contrast computed tomography in non-ideal environments.*" Sci Rep 6, 31197 (2016) and Fabio A. Vittoria et. al. in "Beam tracking approach for single-shot retrieval of absorption, refraction, and dark-field signals with laboratory x-ray sources," Applied Physics Letters, Vol. 106, Issue 22, (2015).

Once modelled, the projection data processing module 102, calculates the attenuation component contribution $C_{AT, TR}$ by calculating the area under the fitted parameterized curve. To determine the contribution of the phase component $C_{PH, TR}$, the projection data processing module 102, calculates the phase shift between the fitted parameterized curve and a baseline parameterized curve fitted to a baseline projection data for the respective detector pixel. Such baseline projection data is typically obtained during the calibration of the imaging system when no object is imaged.

It is worth noting, the steps 322 and 324 can be performed in a reversed order. In this case, the attenuation and phase components will be derived in the same way as described in step 324 directly form second projection data set. Once, derived their corresponding contribution will be transformed to a contribution as acquired at the first energy spectrum. Again, the transformation can be performed in the exact same way as described in step 322.

Next, the projection data processing module 102, uses the derived attenuation and phase components contributions from the transformed projection data set as estimates of the contributions of the first attenuation and first differential phase components to extract the contribution of the dark-field component from the first projection data set. To do so, the contribution of the attenuation, $C_{AT,\ TR}$ and phase components $C_{PH,\ TR}$ derived from the transformed projection data set are used as constraints to model 326 the first set of projection data per detector pixel using a parameterized function, e.g., a Gaussian function, in the same way as detailed above with reference to step 324. The values of the $C_{AT,\ TR}$ and $C_{PH,\ TR}$ components are thus used to enforce (i) the area under the Gaussian function being fitted to the first set of projection data to correspond to the value of $C_{AT,\ TR}$, and (ii) the shift of the Gaussian function being fitted to the first set of projection data to correspond to the value of $C_{PH,\ TR}$.

Once the intensity distributions for the respective pixels are modelled, the projection data processing module 102 extracts 328 the dark-field component contribution by calculating the difference in spread of the fitted parameterized curve with respect to the baseline parameterized curve.

In the final step, i.e., step 330, the projection data processing module 102 feeds the extracted dark-field component contributions for the respective detector pixels to the image reconstruction module 104. In this example embodiment, the image reconstruction module creates the dark-field image by simply ordering the extracted dark-field component contribution in the form of a two-dimensional array.

Figure 3B:
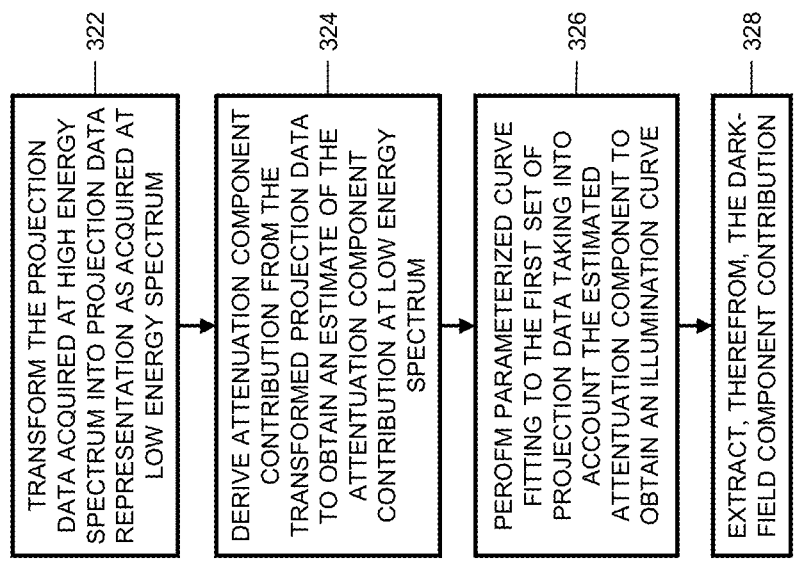
FIG. 3B shows steps for obtaining dark-field X-ray projection data according to the second example embodiment of the present disclosure.
Figure 3A:
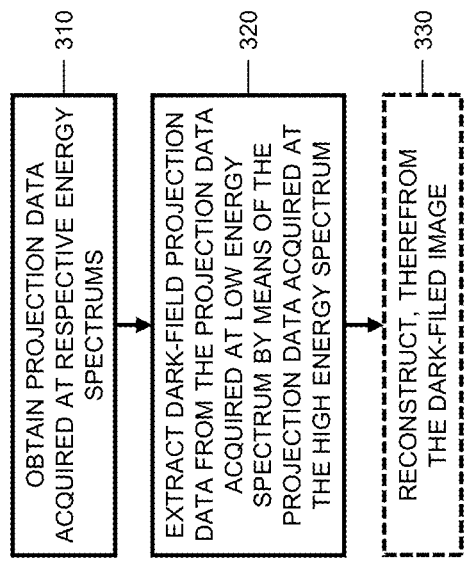
FIG. 3A shows steps for obtaining dark-field X-ray image according to a second example embodiment of the present disclosure.
Figure 3C:
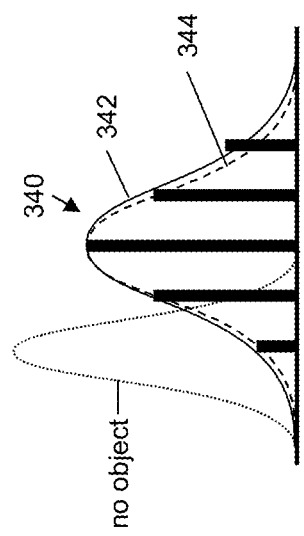
FIG. 3C shows the result of the parameterized curve fitting according to the second example embodiment of the present disclosure.

The advantage of extracting the dark-field projection data using the method according to the present disclosure is conceptually illustrated in FIG. 3C. FIG. 3C shows the result 342 of a Gaussian function fitted to the projection data 340 for a respective pixel in a conventional way, i.e., without using constrained fitting, and the result 344 of the Gaussian function fitted to the same projection data using, in this case, the constrained fitting as described above with reference to FIG. 3A and FIG. 3B. In this conceptual example, modelling the projection data as described herein results in a narrower spread of the fitted Gaussian, and, thus, in a lower contribution of the dark-field component. Thus, the corresponding pixel in the resulting dark-field image will have a lower intensity.

In some embodiments, the extracting step 220 or 320 as described with reference to FIG. 2A, FIG. 2B, and with reference to FIGS. 3A and 3B can be performed in a single step by means of a deep learning model which is trained to perform the extracting. The deep learning model can be trained by means of a learning system implementing, for example, an autoencoder which is an example of a convolutional neural network. The learning system however may implement other types of neural networks, such as a deep neural network, DNN, a recurrent neural network, RNN, a graph neural network, GNN. Once trained, the deep learning model can perform the extracting of the dark-field X-ray projection data from the first set of X-ray projection data by means of the second set of X-ray projection data.

The training of the deep learning model is performed using a training data set which comprises sets of X-ray projection data of one or more ground truth objects acquired at the first and second energy spectrums. The various ground truth objects can, for example, comprise one material or a combination of materials. The materials can, for example, correspond to the various soft tissues and/or hard tissues found in the human body. The materials can also comprise various compositions of industrial samples when X-ray imaging system of FIG. 1A and FIG. 1B is used for imaging industrial materials such as a composition of different plastics, fibre bundles in composite materials of powder, and so on.

An example architecture of an autoencoder neural network and the method for training the autoencoder for performing the extracting step 220 or 320 will be now described with reference to FIG. 4. The autoencoder comprises an encoder 410 comprising several convolutional layers, a decoder 420 comprising several deconvolutional layers, and a control logic 430 that encourages the encoder 410 to filter out the attenuation component from the first set of X-ray projection data 411 by means of the second set of X-ray projection data 421. The encoder and decoder can comprise the same or different number of layers. In this figure, encoder 410 is illustrated to have five convolutional layers, and decoder 420 to have five deconvolutional layers.

At each iteration, the encoder 410 receives the obtained sets of X-ray projection data. The encoder will receive the first set of projection 411 and the second set of projection data 421. In FIG. 4, the autoencoder is shown to be trained to perform the extracting as shown in FIG. 2A and FIG. 2B or the extracting as shown in FIG. 3A and FIG. 3B. In the example shown in FIG. 2A and FIG. 2B, the projection data sets are fed to the encoder in the form of a one- or two-dimensional data structure, for example. At each convolutional layer of the encoder, the projection data sets are essentially downsampled to obtain an encoded representation 422 of the projection data sets. The encoded representation 422 is then decoded by the decoder 420 by upsampling the encoded representation at the respective deconvolutional layers to obtain a decoded or filtered projection data set 423. Once decoding is complete, the method proceeds to enforce filtering of the first set of X-ray projection data 411 into a filtered projection data set 423. For this purpose, the original sets of projection data 411 and 421, the encoded projection data set 422 as well as the decoded projection data set 423 are all fed to the control logic 430 which maximizes the suppression of the attenuation component and optionally the differential phase component in the first set of projection data set 411 while preserving the dark-field component. Maximizing the suppression ensures that the encoding enforces extraction of the dark-field component and suppression of the other components and that the decoding enforces correct reconstruction of the extracted dark-field component. As a result, the control logic 430 outputs one set of encoding parameters 431 and another set of decoding parameters 432 to control the downsampling and the upsampling of the projection data at the respective convolutional and deconvolutional layers. The process is repeated until the attenuation component and optionally the differential phase components are optimally suppressed in the decoded projection data set. Once the autoencoder is trained, the autoencoder 400 can be used to perform the extraction step 220 or 320 on the actual projection data sets.

In the example of FIGS. 3A and 3B, the autoencoder is trained in the same manner as described above with the only difference that the control logic 430 aims at enforcing the extraction of the dark-field projection data by improving the estimation of the first attenuation component contribution, i.e., step 322 and 324 of FIG. 3B.

In some embodiments the transforming step 222 or 322 as described with reference to FIG. 2B and with reference to FIG. 3B can be performed by a generative adversarial network, GAN, which is another example of a deep learning architecture. A GAN estimates how data points are generated in a probabilistic framework. It consists of two interacting neural networks, i.e., a generator neural network G and a discriminator neural network D, which are trained jointly through an adversarial process. Conceptually, the objective of neural network G is to synthesize fake data that resemble real data, while the objective of neural network D is to distinguish between real and fake data. Once trained through the adversarial training process, the generator neural network G can then generate fake data that match the real data distribution.

Figure 5:
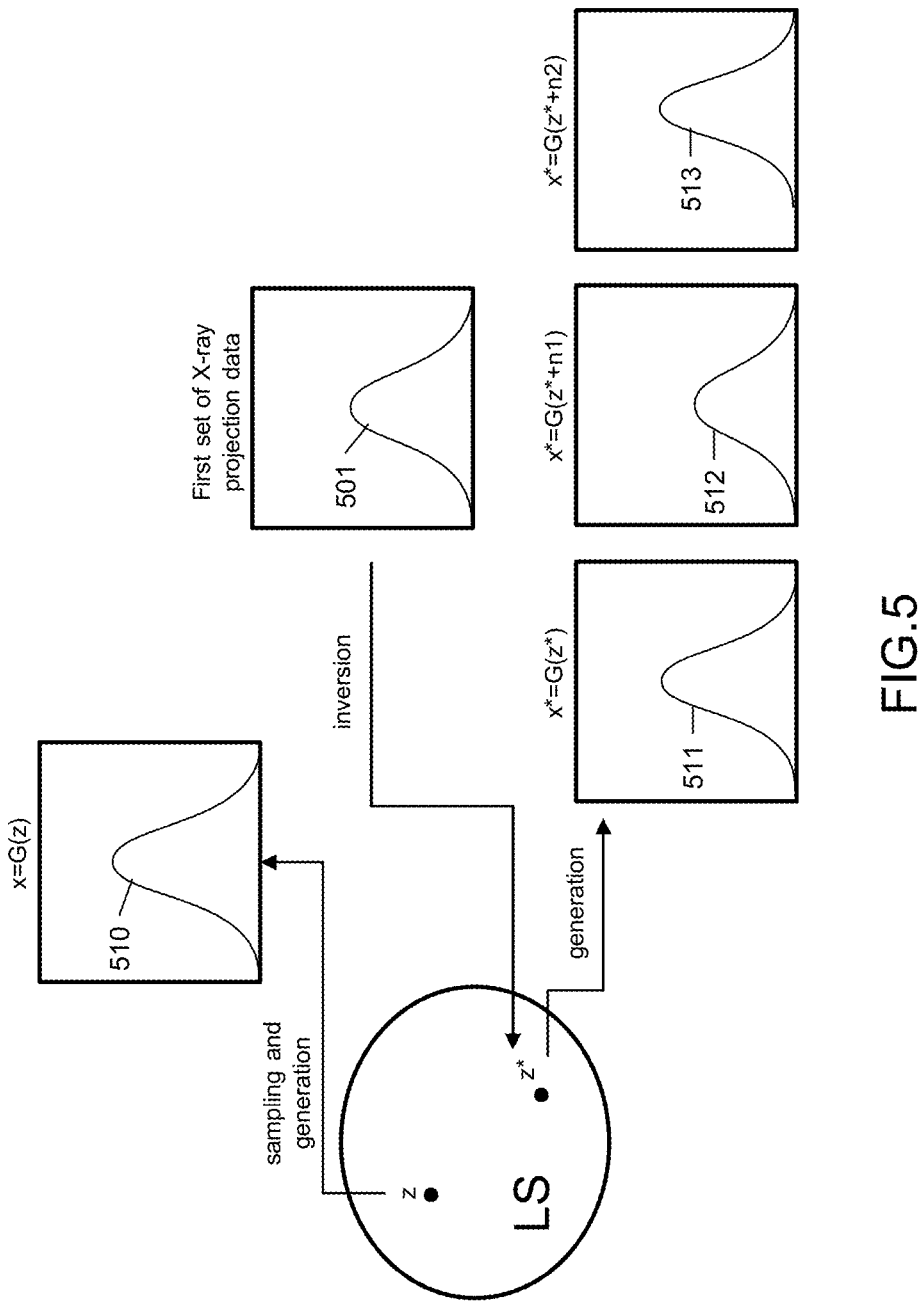
FIG. 5 shows conceptual examples of a projection data transformed by a deep learning model trained by means of a generative adversarial neural network, GAN, according to the present disclosure.

In the example shown in FIG. 2A and FIG. 2B, the GAN can be trained to transform the second set of X-ray projection data and the baseline X-ray projection data set into projection data representation as acquired at the low energy as shown in FIG. 5. Similar to the example of FIG. 4, the GAN can be trained using training data set comprising sets of X-ray projection data of one or more ground truth objects acquired at the first and the second energy spectrums.

During the training, the GAN inversion aims to invert the given X-ray projection data set 501 into a latent space, LS, of the GAN learning model. The given projection data set is then transformed from the inverted code by the generator G into a projection data 511, . . . , 513 as acquired at the low energy. Once the given projection data set is inverted into the latent space, the inverted code is varied within the latent space to modify the corresponding attribute of the projection data such that an optimal transformation is performed. More in details, the GAN inversion maps the given the projection data set x to the latent space, LS, to obtain the latent code z*. From there, a transformed projection data set x* is then obtained by x*=G (z*). Thus, by simply varying the latent code z* in different interpretable directions, e.g., z*+$n_1$ or z*+$n_2$ where $n_1$ and $n_2$ model respective parameters such as energy, luminosity, etc. in the latent space LS, the corresponding attribute of the given projection data set can be modified. Modifying these parameters allows optimizing the transformation of the given projection data set x into a projection data set x* as obtained at the low energy. The parameters are modified until the transformation of the projection data sets satisfy a cost function. Once the output of the cost function reaches a satisfactory error level, then the training of the GAN is completed.

Thus, during the training of the learning model of the GAN, the goal is to find a path in latent space LS that transforms the projection data 510, i.e., x=G(z), to its transformed version x*=edit(G(z, α)). The transformation can be then represented as G(z+αw) for a linear transformation or G (f(f( . . . (z)) for a non-linear transformation. Once trained, the generator G can be used to perform the transformation step 222 on the actual projection data sets.

In the example shown in FIG. 3A and FIG. 3B, the GAN can be trained to transform the second set of X-ray projection data and the baseline X-ray projection data set into projection data representation as acquired at the low energy in the same way as detailed above. In the same way, the GAN can be trained to transform the contribution of the second attenuation component into a contribution as acquired at low energy, or the GAN can be trained to transform the contributions of both the second attenuation component and the second differential phase component into contributions as acquired at the low energy.

The energies to image the object or the material composition can be selected from a material-energy plot that characterizes the relationship between them. Such material-energy plots can be derived by running a series of monochromatic simulations for the various materials that one expects in the sample, in order to investigate the magnitude of the dark field signal, i.e., the contribution of the dark-field component, e.g., in terms of beamlet broadening in an edge-illumination setup, as a function of energy. It can then be observed that dark field signal drops towards higher energies as shown in plot in FIG. 1A. This is an indication that a second set of projection data set acquired at a sufficiently high energy will be substantially a 'dark-field free' projection data. The resulting plots can then be used to derive the optimal kV settings for the first and/or second energy spectrum. The high energy for imaging the desired object or material composition is then selected to be as high as possible but low enough so that the obtained projection data can be successfully transformed into a projection data representation as acquired at the lower energy. Similarly, the low energy for imaging the desired object or material composition is selected to be as low as possibly so that the contribution of the dark-field image is as high as possible. Alternatively, polychromatic simulations may be performed for different kV settings to generate these plots.

Instead of acquiring only one second set of projection data, multiple second sets of X-ray projection data can be acquired with energy spectra having effective energy higher than the effective energy of the first set of X-ray projection data. Importantly, the focus does not lie in the entire energy spectrum, but on its effective energy only. For example, if the first projection data set is acquired at an effective energy of 60 KeV, two second projection data sets can be acquired at the effective energy of 100 keV and 120 keV. Similar to above, these second sets of X-ray projection data will also have a lower dark-field component contribution than the dark-field component contribution in the first projection data set. The two second sets of projection data set can then be used to extract the dark-filed component contribution in the first set of projection data in the same way as described above with reference to FIG. 2A to FIG. 2B and FIG. 3A to FIG. 3B. More specifically, the two second set of projection data are transformed into a single projection data representation as acquired at the first energy which is then used to extract the dark-field component from the first projection data set. Using two or more second sets of X-ray projection data allows for better or more precise extraction of the dark-field component contribution as the material-energy relationship can be exploited in a more precise way when, for example, training the learning model shown in FIG. 4 or FIG. 5.

Although the present invention has been illustrated by reference to specific embodiments, it will be apparent to those skilled in the art that the invention is not limited to the details of the foregoing illustrative embodiments, and that the present invention may be embodied with various changes and modifications without departing from the scope thereof. The present embodiments are therefore to be considered in all respects as illustrative and not restrictive, the scope of the invention being indicated by the appended claims rather than by the foregoing description, and all changes which come within the scope of the claims are therefore intended to be embraced therein.

It will furthermore be understood by the reader of this patent application that the words "comprising" or "comprise" do not exclude other elements or steps, that the words "a" or "an" do not exclude a plurality, and that a single element, such as a computer system, a processor, or another integrated unit may fulfil the functions of several means recited in the claims. Any reference signs in the claims shall not be construed as limiting the respective claims concerned. The terms "first", "second", third", "a", "b", "c", and the like, when used in the description or in the claims are introduced to distinguish between similar elements or steps and are not necessarily describing a sequential or chronological order. Similarly, the terms "top", "bottom", "over", "under", and the like are introduced for descriptive purposes and not necessarily to denote relative positions. It is to be understood that the terms so used are interchangeable under appropriate circumstances and embodiments of the invention are capable of operating according to the present invention in other sequences, or in orientations different from the one(s) described or illustrated above.

The invention claimed is:

1. A computer-implemented method for obtaining dark-field X-ray projection data of an object comprising:
    obtaining a first set of X-ray projection data of the object acquired at a first energy spectrum; the first set of X-ray projection data comprising a first attenuation component, a first phase component, and a first dark-field component;
    obtaining a second set of X-ray projection data of the object acquired at a second energy spectrum having a higher effective energy than the first energy spectrum; and
    extracting dark-field projection data from the first set of X-ray projection data by the second set of X-ray projection data having a lower dark-field component contribution than the first set of X-ray projection data.

2. The computer-implemented method according to claim 1, wherein the second set of X-ray projection data of the object comprises a second attenuation component, and a second dark field component, and wherein the extracting comprises:
    estimating the contribution of the first attenuation component based on the second set of X-ray projection data, thereby obtaining an estimate for the first attenuation component contribution; and
    determining the first dark-field component contribution from the first set of X-ray projection data by taking into account the estimated first attenuation component contribution.

3. The computer-implemented method according to claim 2, wherein the second set of X-ray projection data further comprises a second phase component, and, wherein the extracting comprises:
    estimating the first attenuation component contribution and the first phase component contribution based on the second set of X-ray projection data; and
    determining the first dark-field component contribution from the first set of X-ray projection data by taking into account the estimated first attenuation component contribution and the estimated first phase component contribution.

4. The computer-implemented method according to claim 2, wherein the determining comprises modelling the first set of X-ray projection data by a parameterized curve fitting, the parameterized curve fitting taking into account the estimated first attenuation component contribution, or the estimated first attenuation component and the estimated first phase component contributions.

5. The computer-implemented method according to claim 1, wherein the extracting comprises:
    transforming the second set of X-ray projection data into projection data representation as acquired at the first energy spectrum, thereby obtaining a transformed set of X-ray projection data;
    filtering out the first attenuation component from the first set of X-ray projection data by the transformed set of X-ray projection data, thereby obtaining a filtered set of X-ray projection data comprising the first phase component and the first dark-field component; and
    extracting, therefrom, the dark-field X-ray projection data.

6. The computer-implemented method according to claim 5, wherein the second set of X-ray projection data of the object comprises a second attenuation component, a second phase component, and a second dark field component; and
    wherein the filtering out comprises filtering out the first attenuation component and the first phase component from the first set of X-ray projection data by the transformed set of X-ray projection data, thereby obtaining the dark-field X-ray projection data.

7. The computer-implemented method according to claim 1, wherein the extracting is performed by a learning model trained to perform the extracting.

8. The computer-implemented method according to claim 1, the method further comprises selecting the first energy spectrum and the second energy spectrum for imaging a desired material of the object,
    wherein the selecting is done based on a pre-determined relationship between the energy spectrum and the desired material.

9. The computer-implemented method according to claim 1, wherein the X-ray projection data is acquired by a phase-contrast X-ray imaging system comprising one or more gratings, or, a speckle-based filter.

10. The computer-implemented method according to claim 1, the method further comprising reconstructing the extracted dark-field projection data into an X-ray image.

11. A computer program product comprising computer-executable instructions for causing an apparatus to perform the computer-implemented method according to claim 1 when run on the apparatus.

12. A computer readable storage medium comprising computer-executable instructions for causing an apparatus to perform the computer-implemented method according to claim 1 when run on the apparatus.

13. An apparatus for obtaining dark-field X-ray projection data of an object, the apparatus comprising at least one processor and at least one memory including computer program code, the at least one memory and computer program code configured to, with the at least one processor, cause the apparatus to perform:
    obtaining a first set of X-ray projection data of the object acquired at a first energy spectrum; the first set of X-ray projection data comprising a first attenuation component, a first phase component, and a first dark-field component;
    obtaining a second set of X-ray projection data of the object acquired at a second energy spectrum having a higher effective energy than the first energy spectrum;
    extracting dark-field projection data from the first set of X-ray projection data by the second set of X-ray projection data having a lower dark-field component contribution than the first set of X-ray projection data.

14. A phase-contrast X-ray imaging system configured to acquire sets of X-ray projection data of an object at energy spectrums having respective effective energies and comprising the apparatus according to claim 13.

15. The phase-contrast X-ray imaging system according to claim 14, wherein the imaging system comprises an X-ray band-pass filter for allowing emission of X-rays with the respective energy spectrums.

* * * * *